United States Patent Office 3,803,299
Patented Apr. 9, 1974

3,803,299
METHOD OF PRODUCING A DIAGNOSTIC PREPARATION ON THE BASIS OF MACRO-AGGREGATES OF SERUM ALBUMIN LABELLED WITH 99mTc
Jean-Paul Nouel, Boisguillaume, France, assignor to U.S. Philips Corporation, New York, N.Y.
No Drawing. Filed May 24, 1971, Ser. No. 146,544
Claims priority, application France, May 22, 1970, 7018679
Int. Cl. A61k 27/04
U.S. Cl. 424—1                              3 Claims

ABSTRACT OF THE DISCLOSURE

Method of producing serum albumin macroaggregates labelled with 99mTc by providing powdered macroaggregates of serum albumin with colloidal sulfur particles containing 99mTc.

---

The present invention relates to a method of producing a diagnostic preparation on the basis of macro-aggregates of serum albumin labelled with 99mTc, which preparation is important for various scintigraphic examinations.

The term "macro-aggregates" is used herein to mean particles the diameters of which are such (larger than 10 μm.) that they may be arrested by the capillaries. These macro-aggregates labelled with a radio-isotope are used in particular in lung function investigations. After intravenous injection the macro-aggregates are retained by the capillary system of the lungs, permitting a snapshot of the physiological vascular system of the lungs to be obtained.

The most commonly used macro-aggregates are those of human albumin (serum albumin) owing to their non-toxicity and their ready digestibility in the capillaries by the phagocytes. As a result, the obstruction of capillaries is of comparatively short duration.

Various radio-isotopes has been used for labelling the macro-aggregates, and especially 99mTc the use of which in medicine is particularly favorable owing to its short half-life (6 hours, the γ-ray energy (140 kev) and the absence of β-ray emission (rays which increase the irradiation of the subject without being externally detectable). The use of 99mTc permits a reduction of the radiation dose rate whilst increasing the injected activity, and hence the statistical accuracy of the counts, and reducing the duration of the examination.

99mTc further is suitable for use for various diagnostic examinations, such as examinations of the thyroid, brain, liver, kidney and spleen, in combination with different carriers. This wide field of application permits a reduction in the stock of radio-active substances.

In addition, 99mTc may be simply obtained by elution of a generator, as described, for example, in French patent specification No. 1,518,130. In this method the 99mTc is contained in the form of sodium pertechnetate in an isotonic saline solution. This product may be mixed with the carriers desired for a given examination. According to a known method of producing macro-aggregates of 99mTc-labelled serum albumin, heptavalent 99mTc is reduced with the use of ascorbic acid and ferric ions to pentavalent 99mTc which subsequently is adsorbed on previously prepared macro-aggregates of human serum albumin. This method has the disadvantage that the labelling efficiency is not constant and the labelling process comprises a large number of stages which consume much time and give rise to sterility problems.

In a paper in "Journal of Nuclear Medicine," vol. 10, No. 10, pp. 621–623, October 1969, a method of preparing 99mTc-labelled macro-aggregates of serum albumin is described in which sodium pertechnetate and sodium thiosulphate are heated under acid conditions, resulting in colloidal sulphur which binds the technetium, whereupon the reaction mixture is added to newly prepared serum albumin, after which the pH is brought to a value of about 5.2, and finally the assembly is heated at 95° C. and agitated.

This method of preparation also is comparatively laborious and hence time consuming and subject to difficulty in maintaining the necessary sterility.

It is an object of the present invention to obviate the said disadvantages and to provide a particularly simple new method of preparation.

The invention relates to a method of producing a diagnostic preparation on the basis of macro-aggregates off 99mTc-labelled serum albumin with the ues of colloidal sulphur particles provided with 99mTc, which method is characterized in that to powdered macro-aggregates of serum albumin a compound producing colloidal sulphur, a pertechnetate compound containing 99mTc and an acid are added, the resulting solution is allowed to stand for some minutes at room temperature and then is treated with a base to a pH of from 4 to 8.

As an example of a compound producing colloidal sulphur is sodium thiosulphate. A suitable pertechnetate compound is sodium pertechnetate.

The treatment with a base has the object of adjusting the pH of the solution to a value such that there is no objection to parenteral administration of the solution.

Suitable bases are, for example, physiological sulphur mixtures on the basis of sodium succinate or trihydroxymethylaminomethane.

However, more specifically it has been found that in the method according to the invention freeze-dried macro-aggregates of the serum albumin are preferably used.

In this connection it should be pointed out that we have found from freeze-drying experiments with macro-aggregates of serum albumin that freeze-dried macro-aggregates are very stable and may be stored at room temperature for at least 2 months without the occurrence of chemical or physical changes.

In the known sterile solutions of macro-aggregates of serum albumin there is rapid agglomeration of particles and degradation of enzymes, so that these solutions can only be stored for one week at most.

In a further preferred embodiment of the method according to the invention the starting material is a powdered mixture of freeze dried macro-aggregates of serum albumins and freeze-dried sodium thiosulphate.

This preferred embodiment of the method according to the invention provides the advantage that a separate addition of thiosulphate may be dispensed with. The factory delivers the sterile mixture of macro-aggregates and thiosulphate, so that the user when producing the diagnostic preparation has to perform a smaller number of operations. The only operations which remain are simple, such as adding the acid to the pertechnetate compound containing the 99mTc and adjustment of the pH, whilst moreover these operations may be performed at room temperature.

The invention also relates to a preparation suitable for use in the method according to the invention, which preparation is characterized in that it contains powdered freeze-dried macro-aggregates of serum albumin and preferably a freeze-dried thiosulphate compound.

This preparation may be simply produced by freeze-drying an aqueous solution of the macro-aggregates and preferably of a thiousulphate compound according to a known technique.

The invention will now be described more fully with reference to the following examples.

EXAMPLE I

To freeze-dried macro-aggregates there is added an amount of HCl such that the pH of the mixture becomes less than 1, after which there are added sodium pertechnetate containing 99mTc in an amount depending upon the examination to be performed, and sodium thiosulphate. After incubation at room temperature for from 10 to 15 minutes the resulting solution is buffered with trihydroxymethylaminomethane to a pH between 5 and 6.

The resulting solutions of serum albumin macro-aggregates labelled with 99mTc are ready for use for various forms of scintigraphy.

EXAMPLE II

To 5 g. of powdered macro-aggregates of serum albumin, sodium pertechnetate containing 99mTc in an amount depending upon the respective examination, 1.4 ml. of N.HCl and 10 mgs. of sodium thiosulphate are added.

After incubation at room temperature for 10 minutes the resulting solution is buffered to a pH of 5 by means of 2 ml. of sodium succinate solution (M).

The labelling efficiency is measured by separating by means of a centrifuge the unbound 99mTc from the 99mTc bound to serum albumin and is found to be 85%.

Doses of the resulting solution having an activity of 0.1 millicurie were injected into a test animal (rabbit), giving highly satisfactory scintigraphic images of the lungs.

What is claimed is:

1. A method of producing a diagnostic preparation containing macro-aggregates of human serum albumin labelled with 99mTc, said method comprising the steps dissolving freeze-dried powdered macro-aggregates of human serum albumin, a compound capable of producing colloidal sulfur particles upon treatment with an aqueous acid and a pertechnetate compound containing 99mTc in an aqueous acid, allowing the resultant solution to stand at room temperature for several minutes and then treating the solution with a base until the solution has a pH of from 4 to 8.

2. A preparation suitable for use in preparing the solution formed in the method of claim 1 consisting essentially of a mixture of powdered freeze-dried macro-aggregates of human serum albumin and a powdered freeze-dried thiosulfate compound.

3. A method of producing a diagnostic preparation containing macro-aggregates of human serum albumin labelled with 99mTc, said method comprising the steps adding to a powdered mixture of freeze-dried macro-aggregates of human serum albumin and freeze-dried sodium-thiosulfate a pertechnetate compound containing 99mTc and an aqueous acid, allowing the resultant solution to stand at room temperature for several minutes and then treating the solution with a base until the solution has a pH of from 4 to 8.

References Cited

De Paoili et al., Nuclear Sci. Abs., vol. 20, No. 23, Dec. 15, 1966 (item 43390).

"Journal of Nuclear Medicine," vol. 10, No. 10, pp. 621–623, October 1969.

Stern et al., Nuc. Sci. Abs., vol. 20, No. 2, pp. 3295–6, August 1966 (item 27028).

Stern et al., Nuc. Sci. Abs., vol. 21, No. 12, p. 2143, June 30, 1967 (item 20304).

BENJAMIN R. PADGETT, Primary Examiner

U.S. Cl. X.R.

23—230 B; 252—301.1 R; 424—177, 359